Nov. 21, 1950   R. G. LE TOURNEAU   2,530,776
PIVOTED BOLSTER FOR LOG HAULERS
Filed July 26, 1949
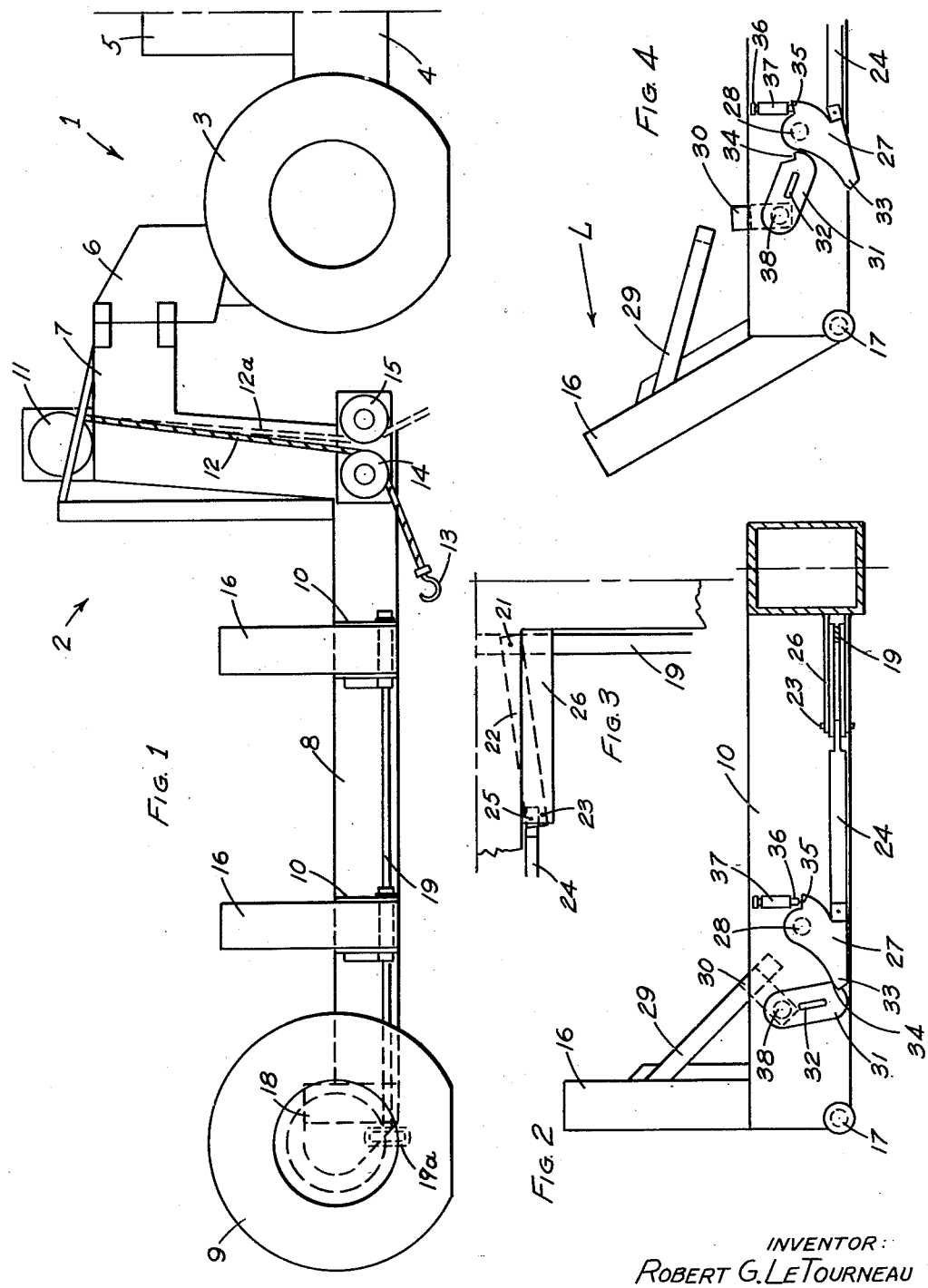
INVENTOR:
ROBERT G. LE TOURNEAU
BY
F. D. Copeland Jr.
AGENT Patented Nov. 21, 1950

2,530,776

UNITED STATES PATENT OFFICE 2,530,776

PIVOTED BOLSTER FOR LOG HAULERS

Robert G. Le Tourneau, Longview, Tex., assignor to R. G. Le Tourneau, Inc., Peoria, Ill., a corporation of California Application July 26, 1949, Serial No. 106,910

2 Claims. (Cl. 280—145)

This invention relates to hauling vehicles and more specifically to a vehicle which includes a load discharging mechanism.

The primary object of this invention is to provide a vehicle for hauling logs, pipe, etc. which contains side bolsters which permit the load to be discharged selectively on one side or the other.

Another object is to provide a vehicle of this type which includes a utility winch and an arrangement whereby the winch may be used to assist the vehicle in pulling out of ruts in the road should it become bogged down.

A further object is to provide a unique tripping arrangement for selectively releasing the bolsters on either side which is manually operated from the rear of the vehicle.

A still further object is to provide a simple, rugged vehicle which is practical and effective for the purposes for which it is designed.

In the drawing:

Fig. 1 is a side elevation of the log wagon.

Fig. 2 is a fragmentary elevation of one cross beam showing the load tripping arrangement.

Fig. 3 is an enlarged cut-away plan view of the linking arrangement of the trip mechanism.

Fig. 4 is a fragmentary view showing the bolsters immediately after the tripping mechanism has been actuated.

Referring to the drawing, the complete log hauler consists of a two wheel tractor indicated generally at 1 and a two wheel trailer indicated at 2. The tractor 1 includes large pneumatic tires 3, supporting a frame 4 with engine 5 and power steering hitch 6 thereon. The trailer 2 consists of a goose-neck yoke 7 for connecting the trailer and the tractor in steerable relation, a main center beam 8, supported at the rear by wheels 9, including spaced cross beams 10 projecting laterally from both sides of main beam 8.

An electric winch 11 is mounted at the top of yoke 7 and its cable 12 containing hook 13 is reeved down and around either of two sheaves 14 and 15 (as indicated at 12a). By this arrangement the cable may lead out either to the front or rear of the vehicle for attachment to a fixed object, such as a tree, or to another vehicle, to assist in pulling itself out of ruts should it become stuck. This winch and cable may also be used without these sheaves, to assist in loading and unloading and for general utility purposes. This winch is powered by a generator mounted on the tractor and driven by the tractor engine.

The cross beams 10 contain an upstanding bolster 16 which is pivoted thereto by pin 17. The bolsters on either side are released by a pull on the handle 19a on that side which projects rearward thru rear axle beam 18. When one handle 19a is pulled its link rod 19 being attached to link arms 22 at pin 21, causes the attached arms 22 to pivot about fixed pivot pin 23, and thereby cause pull strap 24 to move laterally inward since it is connected to arm 22 by a single pin 25 (which pin does not project into link housing 26 as does pin 23). Pull strap 24 is pivotally connected to latch 27 and this latch is pivoted to cross beam 19 by pivot shaft 28.

When bolster 16 is in its upright carrying position as in Fig. 2, it is retained in that position by catch frame 29 which hooks over trip lever 30. This lever is rigidly fastened to retainer plate 31 which includes a handle 32 to facilitate manual resetting of the load tripping mechanism. Retainer plate 31 includes a notch 34 which engages a correspondingly shaped point 33 of latch 27. A flat shoulder 35 of this latch just touches a spring loaded plunger 36 of spring box 37 mounted to cross beam 10.

Fig. 4 shows the relative position of parts after a pull on handle 19a of link rod 19. Strap 24 in being moved inward by such a pull causes latch 27 to pivot about pin 28 and thereby release retainer plate 31. Since trip lever 30 then has no retaining force, it rotates about its shaft 38 under the action of the outward load pressure indicated as L. Bolster 16 is seen to move out and down in pivoting about pin 17. Any load carried on cross beams 10 may then be moved off the released side without obstruction. Or in the case of logs, many will roll off without assistance.

After the load is discharged, the bolster 16 is raised to its upright position and retainer 31 is manipulated by its handle 32 until trip lever 30 is secured within catch frame 29. At this point latch 27 will lock with retainer 31 by means of their respective point 33 and notch 34; being aided here by the pressure of spring plunger 36 acting on latch surface 35. The shape of the large curved surface 39 of latch 27 is such that plate 31 when being returned may do so with a minimum of resistance; the leverage from using handle 32 will move latch 27 back against the pressure of plunger 36.

From the foregoing description, it will be readily seen that there has been produced such a device as substantially fulfills the objects of the invention as set forth herein.

While this specification sets forth in detail the present and preferred construction of the device, still in practice such deviation from such detail may be resorted to as do not form a de-

Having thus described my invention, the following is claimed as new and useful, and upon which Letters Patent is desired:

1. In a hauler including a main beam, transverse cross beams extending laterally in spaced relation from each side of said main beam, load bolsters pivoted to the outer end of the cross beams, a catch frame fastened to said bolster and extending inward and downward, a trip lever pivoted to the cross beam engaging and locking said catch frame, a retainer plate integral with the trip lever, a spring-held latch normally engaging said retainer plate and thereby securing said bolster in an upright position, said latch including a curved outer edge, and the path of travel of said retainer plate at one outer surface substantially corresponding to said curved outer edge.

2. In a hauler including a main beam, transverse cross beams extending laterally in spaced relation from each side of said main beam, load bolsters pivoted to the outer end of the cross beam, a catch frame fastened to said bolster and extending inward and downward, a trip lever pivoted to the cross beam engaging and locking said catch frame, a retainer plate integral with the trip lever, a latch pivoted to said cross beam and normally engaging said retainer plate and thereby securing said bolster in an upright position, a spring loaded plunger adapted to exert a pressure against said latch, said latch including a curved outer edge, a point on said latch at the outer end of said curved edge, a notch in said retainer plate, the path of travel of said retainer plate at one outer surface substantially corresponding to said curved outer edge; a handle associated with said retainer plate to permit said retainer plate to be pulled downward in an arc about the trip lever pivot, said one outer surface of said retainer plate exerting a pressure against said curved outer edge of said latch to cause said latch to pivot slightly against the pressure of its plunger until said notch is aligned with said point, and said latch and said point adapted to lockingly engage under the action of said plunger when aligned.

ROBERT G. LE TOURNEAU.

REFERENCES CITED

The following references are of record in the file of this patent:

UNITED STATES PATENTS

| Number | Name | Date |
| --- | --- | --- |
| 1,278,587 | Burgess | Sept. 10, 1918 |
| 2,178,280 | Hutchins | Oct. 31, 1939 |
| 2,256,623 | Newman | Sept. 23, 1941 |
| 2,294,757 | Larsen | Sept. 1, 1942 |
| 2,469,023 | White | May 3, 1949 |
| 2,469,760 | Berry | May 10, 1949 |
| 2,475,753 | Nordberg | July 12, 1949 |